(12) United States Patent
Brekke (10) Patent No.: US 9,651,666 B2
(45) Date of Patent: May 16, 2017

(54) GLOBAL POSITIONING SYSTEM SIGNAL RECEPTION WITH INCREASED RESISTANCE TO INTERFERENCE

(75) Inventor: Darin William Brekke, Fox Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 1010 days.

(21) Appl. No.: 13/089,559

(22) Filed: Apr. 19, 2011

(65) Prior Publication Data

US 2012/0268321 A1 Oct. 25, 2012

(51) Int. Cl.
| | |
|---|---|
| *G01S 19/11* | (2010.01) |
| *G01S 19/21* | (2010.01) |
| *G01S 19/18* | (2010.01) |
| *G01S 19/46* | (2010.01) |
| G01S 19/03 | (2010.01) |
| G01S 19/45 | (2010.01) |

(52) U.S. Cl.
CPC ............. *G01S 19/11* (2013.01); *G01S 19/18* (2013.01); *G01S 19/21* (2013.01); *G01S 19/46* (2013.01); *G01S 19/03* (2013.01); *G01S 19/45* (2013.01)

(58) Field of Classification Search
CPC .......... G01S 19/10; G01S 10/11; G01S 19/21; G01S 19/31; G01S 19/03; G01S 19/04; G01S 19/11; G01S 19/45; G01S 19/46; G01S 19/48; G01S 19/51; G01S 5/0027; G01S 5/0072; G01S 5/02; G01S 5/0257; G01S 5/0263; G01S 5/0284; G01S 5/06
USPC ............ 342/357.47, 357.48, 357.59, 357.71, 342/357.2, 357.25, 357.28, 357.29, 342/357.34; 701/300, 408, 468, 469, 474, 701/482, 491, 526
See application file for complete search history.

(56) References Cited

U.S. PATENT DOCUMENTS

| | | | | |
|---|---|---|---|---|
| 5,596,332 | A * | 1/1997 | Coles et al. | ................... 342/455 |
| 5,619,211 | A * | 4/1997 | Horkin | ............... H04B 7/18508 |
| | | | | 342/352 |
| 5,872,526 | A * | 2/1999 | Tognazzini | .................. 340/961 |
| 6,023,242 | A * | 2/2000 | Dixon | .......................... 342/359 |
| 6,169,497 | B1 * | 1/2001 | Robert | ................... G08G 1/127 |
| | | | | 340/988 |
| 6,233,459 | B1 | 5/2001 | Sullivan et al. | |

(Continued)

FOREIGN PATENT DOCUMENTS

WO WO9961933 A2 12/1999

OTHER PUBLICATIONS

EP search report dated Oct. 30, 2012 regarding application 12164799.4-2220/2523019, reference P54355EP/RHBH, applicant The Boeing Company, 7 pages.

(Continued)

*Primary Examiner* — Chuong P Nguyen (74) *Attorney, Agent, or Firm* — Yee & Associates, P.C.

(57) ABSTRACT

A method and apparatus for identifying a position of a receiver. A number of first radio frequency signals including navigation information at the receiver is received. The number of first radio frequency signals is sent from a number of platforms configured to receive second radio frequency signals from a plurality of satellites in a global positioning system. The position of the receiver is identified using a number of distances and a number of angles identified from the number of first radio frequency signals and a number of positions for the number of platforms.

25 Claims, 7 Drawing Sheets

(56) References Cited

U.S. PATENT DOCUMENTS

| | | | |
|---|---|---|---|
| 6,433,733 B2* | 8/2002 | Syrjarinne et al. | 342/357.34 |
| 6,639,553 B2* | 10/2003 | Lin | G01C 3/18 |
| | | | 342/357.52 |
| 6,867,741 B2 | 3/2005 | Schaffner et al. | |
| 7,009,557 B2* | 3/2006 | Kirchofer et al. | 342/359 |
| 7,047,022 B2* | 5/2006 | Aoyama | G01S 5/0072 |
| | | | 455/404.2 |
| 7,079,025 B2* | 7/2006 | Michalson | G01C 21/206 |
| | | | 340/539.1 |
| 7,084,809 B2 | 8/2006 | Hockley, Jr. et al. | |
| 7,272,495 B2 | 9/2007 | Coluzzi et al. | |
| 7,372,400 B2* | 5/2008 | Cohen et al. | 342/357.29 |
| 7,408,503 B2* | 8/2008 | Maruyama et al. | 342/357.64 |
| 7,688,261 B2* | 3/2010 | DiEsposti | G01S 5/0252 |
| | | | 342/357.64 |
| 7,889,115 B2 | 2/2011 | Clingman et al. | |
| 2003/0043086 A1 | 3/2003 | Schaffner et al. | |
| 2003/0149512 A1* | 8/2003 | Hrovat et al. | 701/1 |
| 2004/0008138 A1 | 1/2004 | Hockley, Jr. et al. | |
| 2005/0159891 A1 | 7/2005 | Cohen et al. | |
| 2005/0222757 A1 | 10/2005 | Coluzzi et al. | |
| 2007/0118286 A1* | 5/2007 | Wang et al. | 701/213 |
| 2008/0309550 A1* | 12/2008 | Sairo | G01S 5/0027 |
| | | | 342/357.27 |
| 2010/0106416 A1* | 4/2010 | Yochum | 701/213 |

OTHER PUBLICATIONS

European Patent Office Communication, dated Jul. 19, 2016, regarding Application 12164799.4, 8 pages.

Shala et al., "Indoor Positioning using Sensor-fusion in Android Devices," School of Health and Society Department Computer Science Embedded Systems, Sep. 2011, 58 pages.

\* cited by examiner

GLOBAL POSITIONING SYSTEM SIGNAL RECEPTION WITH INCREASED RESISTANCE TO INTERFERENCE

BACKGROUND INFORMATION

1. Field

The present disclosure relates generally to navigation and, in particular, to using global positioning system (GPS) signals for navigation. Still more particularly, the present disclosure relates to a method and apparatus for reducing the effects of interference when using global positioning satellite signals for navigation.

2. Background

Satellite systems are used to provide position and time information that may be received almost anywhere on Earth where an unobstructed line of sight is present to a sufficient number of satellites transmitting these signals. These types of satellite systems are also referred to as global navigation satellite systems (GNSS). A global positioning system (GPS) is a particular example of a global navigation satellite system.

Global positioning system receivers normally identify their position using these signals. The position of a receiver may be identified by calculating the relative times of arrivals of signals transmitted from these signals. These signals include messages that contain the position of the satellite transmitting the message and clock timing information. The clock timing information is used to identify a time of when the message was sent.

The use of receivers that identify positions based on global positioning system signals from satellites has become widespread. These types of receivers can be found in various objects, such as cars, trucks, ships, aircraft, and other types of platforms.

Interference, however, may occur with receivers receiving the signals. The interference may be caused by various sources. These sources may include, for example, objects obstructing or blocking the signals, background radio frequency signals, intentional transmission of radio frequency signals using frequencies of global positioning system satellites, and other sources.

The interference may be such that signals from these satellites may be blocked and/or degraded such that the receiver is unable to identify the position of the receiver using the signals. For example, when the receiver is in aircraft, dependence on a global positioning system signal from satellites may make navigation difficult and less precise if interference reduces the ability of the receiver to obtain a signal with a sufficient quality to identify the position of the aircraft that is as precise as desired.

As a result, aircraft may include other types of positioning systems, such as an inertial navigation unit to aid in instances when global positioning system signals are unavailable or do not have a desired quality. The other systems may not have the accuracy desired, increase the cost of the aircraft, and/or may increase the weight of the aircraft.

Further, using receivers with increased sensitivity to detect and use global positioning system signals may be a solution that works in some cases. Using receivers with increased sensitivity, however, may be more expensive and may increase the weight and/or size of the system in a manner that is undesirable.

Therefore, it would be advantageous to have a method and apparatus that takes into account at least some of the issues discussed above, as well as possibly other issues.

SUMMARY

In one advantageous embodiment, a method for identifying a position of a receiver is provided. A number of first radio frequency signals including navigation information at the receiver is received. The number of first radio frequency signals is sent from a number of platforms configured to receive second radio frequency signals from a plurality of satellites in a global positioning system. The position of the receiver is identified using a number of distances and a number of angles identified from the number of first radio frequency signals and a number of positions for the number of platforms.

In another advantageous embodiment, an apparatus comprises a signal processing system. The signal processing system is configured to receive a number of first radio frequency signals including navigation information. The number of first radio frequency signals is sent from a number of platforms configured to receive second radio frequency signals from a plurality of sources. The signal processing system is configured to identify a position of the signal processing system using a number of distances and a number of angles identified from the number of first radio frequency signals and a number of positions for the number of platforms.

In yet another advantageous embodiment, a method for acquiring a global positioning system signal in an area in which interference is present is provided. The global positioning system signal is received at a receiver associated with a mobile platform. The global positioning system signal is sent from a satellite in a global positioning system. A radio frequency signal including navigation information is received at the receiver. The navigation information includes a first data message. The radio frequency signal is sent from a platform configured to receive the global positioning system signal from the satellite in the global positioning system. Information about a position and movement of the receiver is updated using a position of the platform and the position of the receiver identified using a number of distances and a number of angles that are identified using the radio frequency signal. A second data message in the global positioning system signal is removed using the first data message. The first data message and the second data message are substantially identical. The global positioning system signal is acquired using the information about the position and the movement of the receiver and correlating a first pseudorandom code in the global positioning system signal without the second data message and a second pseudorandom code generated by the receiver.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that one solution may involve receiving signals from global positioning system satellites at ground stations. These ground stations broadcast this data to satellites having a different orbit from the global positioning system satellites to forward those signals to the receiver in a manner that may avoid the interference. The satellites may be, for example, low Earth orbiting (LEO) satellites.

The different advantageous embodiments recognize and take into account that ground stations generate signals by making carrier phase measurements of the signals from the global positioning system satellites and the low Earth orbiting satellites. This information is transmitted through the low Earth orbiting satellites at a higher power, as compared to those transmitted by the global positioning system satellites. In this manner, the different advantageous embodiments recognize and take into account that the receiver may be able to identify its position based on these higher-powered signals.

The different advantageous embodiments also recognize and take into account that this type of system may use more components than desired. The different advantageous embodiments recognize and take into account that with the use of ground stations and low Earth orbiting satellites, additional equipment is needed in positions where a receiver may encounter interference. Providing ground stations and low Earth orbiting satellites in positions needed may be more expensive and difficult than desired.

The different advantageous embodiments recognize and take into account that another solution may involve using an antenna system that steers or selects null positions or areas. The antenna system uses multiple antennas, such as a phased array antenna, and combined signals from other antennas in a particular phase to generate an area of greater or lesser sensitivity. A null area is an area of lesser sensitivity. This null area may be generated in the direction from which signals causing interference originate. As a result, the antenna system is less sensitive to the interference.

The different advantageous embodiments recognize and take into account that although this solution may reduce the effects of interference when multiple sources of interferences are present, the number of null areas may be limited based on the number of elements in the array. As a result, the antenna system may be unable to reduce the effects of interference as much as desired when multiple sources of interference are present. Further, the different advantageous embodiments also recognize and take into account that this type of antenna system may have a size, configuration, and weight that may be undesirable.

Thus, the different advantageous embodiments provide a method and apparatus for identifying a position of a receiver. A number of first radio frequency signals, including navigation information, is received at the receiver. The first number of radio frequency signals is sent from a number of platforms configured to receive second radio frequency signals from a plurality of satellites in a global positioning system. A position of the receiver is identified using a number of distances and a number of angles identified from the number of first radio frequency signals and a number of positions for the number of platforms.

In these illustrative examples, the radio frequency signals are transmitted by the plurality of platforms in a manner that allows the receiver associated with the target platform to identify positions of the plurality of platforms.

Figure 1:
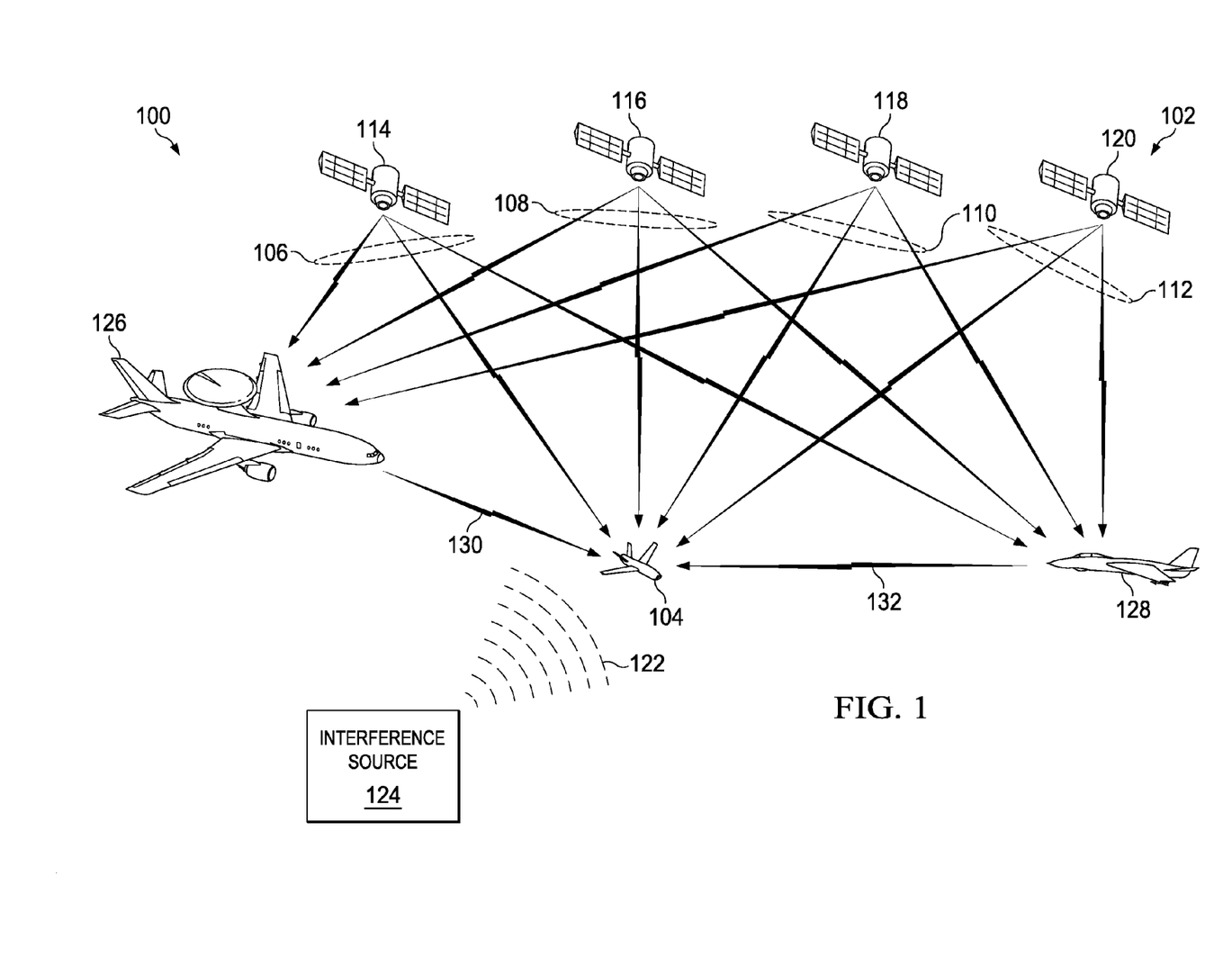
FIG. 1 is an illustration of a navigation environment in accordance with an advantageous embodiment.

With reference now to FIG. 1, an illustration of a navigation environment is depicted in accordance with an advantageous embodiment. As depicted, navigation environment 100 includes platforms 102. In this illustrative example, platforms 102 include a target platform that has a receiver. The target platform with the receiver takes the form of unmanned aerial vehicle 104 in this depicted example.

As illustrated, unmanned aerial vehicle 104 may receive global positioning system signals 106, 108, 110, and 112 transmitted by global positioning system satellites 114, 116, 118, and 120, respectively. Unmanned aerial vehicle 104 uses global positioning system signals 106, 108, 110, and 112 to identify its position. The position of unmanned aerial vehicle 104 is used to perform navigation operations.

For example, the position of unmanned aerial vehicle 104 may be used by unmanned aerial vehicle 104 to fly from a particular position to a target position or fly along a particular route. In these illustrative examples, unmanned aerial vehicle 104 may be unable to identify its position using global positioning system signals 106, 108, 110, and 112 when interference 122 is present. Interference 122 may be generated by interference source 124.

In the different advantageous embodiments, platforms, such as aircraft 126 and aircraft 128, assist unmanned aerial vehicle 104 in identifying the position of unmanned aerial vehicle 104. Aircraft 126 and aircraft 128 are able to receive global positioning system signals 106, 108, 110, and 112 in these illustrative examples.

Aircraft 126 may send information obtained from these global positioning system signals in radio frequency signal 130 to unmanned aerial vehicle 104. In a similar fashion, aircraft 128 also receives global positioning system signals 106, 108, 110, and 112 and sends global positioning system information in radio frequency signal 132 to unmanned aerial vehicle 104. Radio frequency signal 130 and radio frequency signal 132 are transmitted with a strength and/or a direction such that unmanned aerial vehicle 104 is capable of using this information to identify its position.

In these illustrative examples, radio frequency signal 130 includes the information obtained from global positioning system signals 106, 108, 110, and 112. In a similar fashion, radio frequency signal 132 also includes information from global positioning system signals 106, 108, 110, and 112.

Additionally, unmanned aerial vehicle 104 is able to identify the distance and/or position of aircraft 126 and aircraft 128 relative to unmanned aerial vehicle 104. For example, unmanned aerial vehicle 104 is configured to measure a distance and angle of unmanned aerial vehicle 104 relative to aircraft 126 using radio frequency signal 130 and a distance and angle of unmanned aerial vehicle 104 relative to aircraft 128 using radio frequency signal 132.

With this information and the information from the global positioning system signals, unmanned aerial vehicle 104 may identify its position and recover other information from the global positioning system signals, even with the presence of interference 122.

Figure 2:
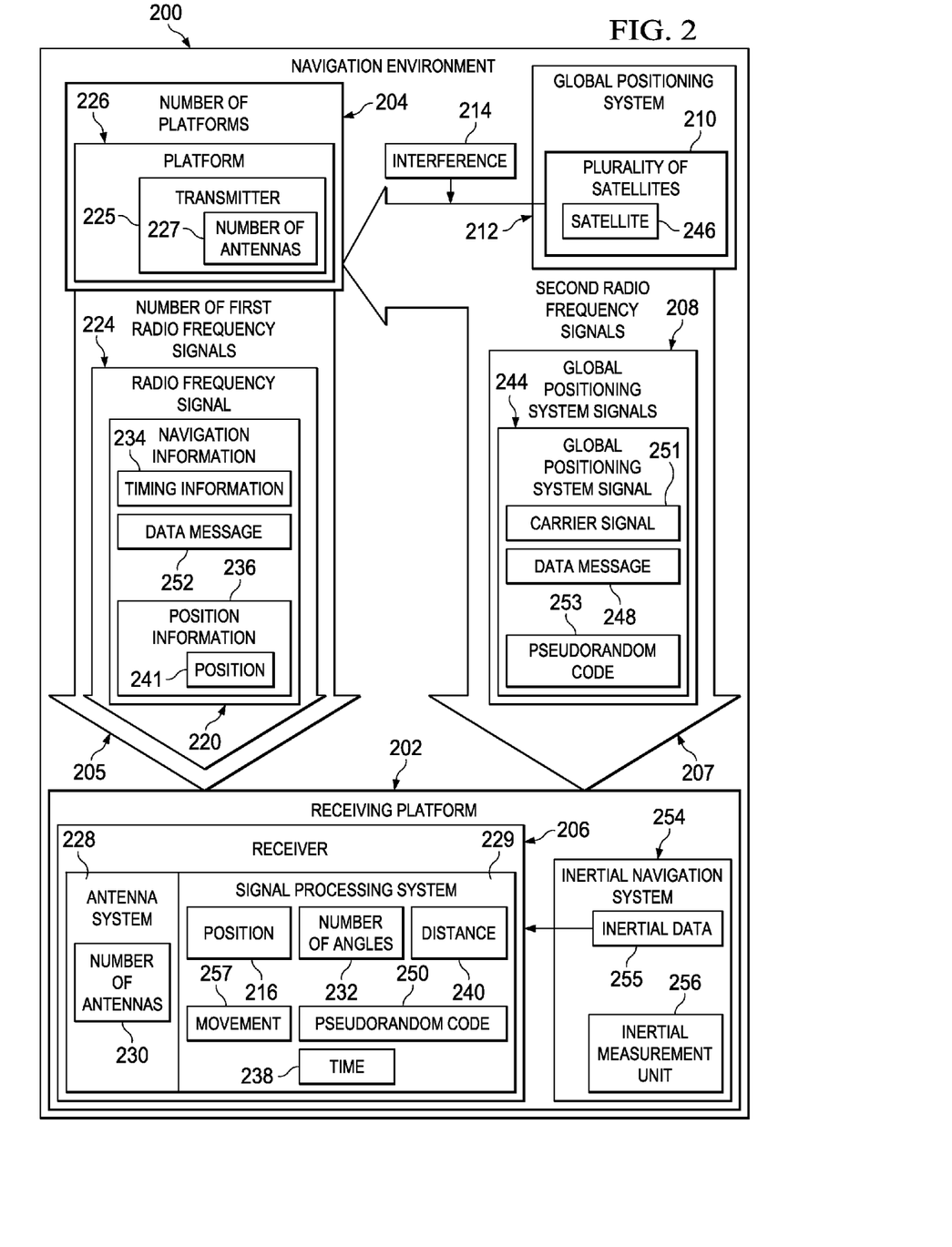
FIG. 2 is an illustration of a block diagram of a navigation environment in accordance with an advantageous embodiment.

With reference now to FIG. 2, an illustration of a block diagram of a navigation environment is depicted in accordance with an advantageous embodiment. Navigation environment 100 in FIG. 1 is an example of one implementation for navigation environment 200 in this figure. As depicted, navigation environment 200 includes receiving platform 202 and number of platforms 204. As used herein, a "number of items" means one or more items. For example, a "number of platforms" means one or more platforms.

In these illustrative examples, receiving platform 202 may be a mobile platform. Further, number of platforms 204 also may be one or more mobile platforms. A mobile platform may take the form of, for example, without limitation, an aircraft, a jet airplane, a helicopter, an unmanned aerial vehicle, a passenger aircraft, a cargo aircraft, a satellite, a space vehicle, a submarine, a personnel carrier, a ground vehicle, a tank, a truck, an unmanned ground vehicle, a train, an automobile, a bus, a surface ship, or some other suitable type of platform.

For example, in one advantageous embodiment, receiving platform 202 takes the form of unmanned aerial vehicle 104 in FIG. 1 with number of platforms 204 taking the form of aircraft 126 and aircraft 128 in FIG. 1.

In these illustrative examples, receiver 206 is associated with receiving platform 202. A first component, such as receiver 206, may be considered to be associated with a second component, such as receiving platform 202, by being secured to the second component, bonded to the second component, welded to the second component, fastened to the second component, and/or connected to the second component in some other suitable manner. The first component also may be connected to the second component using a third component. The first component may also be considered to be associated with the second component by being formed as part of, and/or an extension of, the second component.

Receiver 206 is configured to receive number of first radio frequency signals 205 sent by number of platforms 204. Further, receiver 206 is configured to receive a number of second radio frequency signals 207 sent by various sources. Second radio frequency signals 207 may be, for example, global positioning system signals 208 that are sent by plurality of satellites 210 in global positioning system 212.

As used herein, a "plurality of items" means two or more items. For example, a "plurality of satellites" means two or more satellites. Plurality of satellites 210 may be, more specifically, global positioning system satellites in these examples. Receiver 206 may receive one or more of global positioning system signals 208 sent by one or more corresponding satellites in plurality of satellites 210.

In some instances, interference 214 may be encountered in an area in which receiver 206 is located. Interference 214 may be generated by a number of sources. These sources may include any device that blocks, degrades, and/or introduces undesired noise to a number of global positioning system signals 208 received at receiver 206. When global positioning system signals 208 are received in an area in which interference 214 is present, receiver 206 may be unable to identify position 216 of receiver 206 as accurately as desired using global positioning system signals 208.

In the depicted examples, receiver 206 may identify position 216 of receiver 206 using information provided by number of platforms 204. For example, receiver 206 receives number of first radio frequency signals 205, including navigation information 220, sent by number of platforms 204. Navigation information 220 comprises information used to identify position 216 of receiver 206 relative to number of platforms 204. By identifying position 216 of receiver 206, the position of receiving platform 202 may also be identified.

As one illustrative example, receiver 206 receives radio frequency signal 224 sent by platform 226 in number of platforms 204. Radio frequency signal 224 is a radio frequency wave that may be in the form of, for example, a monopulse radar beacon signal, a radio frequency signal, or some other suitable form.

In this illustrative example, radio frequency signal 224 is sent by transmitter 225 associated with platform 226 and received at antenna system 228. Transmitter 225 may comprise number of antennas 227. Number of antennas 227 may include, for example, a number of omnidirectional antennas, such as monopole antennas. In particular, transmitter 225 may form a monopulse radar beacon configured to send radio frequency signal 224. In some cases, radio frequency signal 224 may take the form of a radio frequency beam.

In these illustrative examples, antenna system 228 is associated with receiver 206. More specifically, antenna system 228 is connected to signal processing system 229 associated with receiver 206. As depicted, antenna system 228 and signal processing system 229 in receiver 206 are electrically connected to each other to form receiver 206.

As used herein, when a first component, such as antenna system 228, is electrically connected to a second component, such as signal processing system 229, the first component is connected to the second component such that an electrical signal can be sent from the first component to the second component, the second component to the first component, or a combination of the two. The first component may be electrically connected to the second component without any additional components between the two components.

Further, the first component also may be electrically connected to the second component by one or more other components. For example, one electronic device may be electrically connected to a second electronic device without any additional electronic devices between the first electronic device and the second electronic device. In some cases, another electronic device may be present between the two electronic devices that are electrically connected to each other.

As depicted, antenna system 228 comprises number of antennas 230. Number of antennas 230 may include, for example, a phased array antenna and at least one of a controlled radiation pattern antenna (CRPA), a micropatch antenna, a quadrifilar helix antenna, an antenna with spiral slot arrays, and other suitable types of antennas. A controlled radiation pattern antenna may comprise a plurality of antenna elements that are configured to reduce interference 214.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Further, in these depicted examples, a portion of number of antennas 230 may be configured to receive global positioning system signals 208, while another portion of number of antennas 230 may be configured to receive number of first radio frequency signals 205.

In these illustrative examples, signal processing system 229 includes at least one of a processor unit, a digital signal processor, a number of integrated circuits, and/or some other suitable type of system for processing signals. A processor unit is hardware and may be a number of processors, a multi-processor core, or some other type of processor, depending on the particular implementation. Further, the processor unit may be implemented using a number of heterogeneous processor systems in which a main processor is present with secondary processors on a single chip.

Signal processing system 229 in receiver 206 receives radio frequency signal 224 as a digital signal and processes the digital signal. As depicted, signal processing system 229 identifies number of angles 232 of receiver 206 relative to platform 226. In these illustrative examples, number of angles 232 may include an elevation angle and an azimuth angle of receiver 206 relative to platform 226.

Further, navigation information 220 in radio frequency signal 224 includes timing information 234 and position information 236. Timing information 234 indicates a time at which radio frequency signal 224 is sent from platform 226. Signal processing system 229 uses timing information 234 to identify time 238. Time 238 is the amount of time it takes for radio frequency signal 224 to travel from platform 226 to antenna system 228.

In these illustrative examples, signal processing system 229 uses time 238 to identify distance 240 between receiver 206 and platform 226. Distance 240 may also be referred to as a range between receiver 206 and platform 226.

Additionally, signal processing system 229 identifies position 241 of platform 226 using position information 236 in navigation information 220. Position information 236 may include position 241 of platform 226 as identified by platform 226.

For example, platform 226 may identify position 241 of platform 226 using second radio frequency signals 207 that may be received from plurality of satellites 210 in global positioning system 212. In other words, platform 226 may identify position 241 using at least a portion of global positioning system signals 208 sent by at least a portion of plurality of satellites 210.

In these depicted examples, platform 226 places position 241 in position information 236 in navigation information 220 in radio frequency signal 224 sent by platform 226 to receiver 206. Signal processing system 229 uses number of angles 232, distance 240, and position 241 of platform 226 to identify position 216 of receiving platform 202 relative to platform 226. In these examples, position 216 identified by signal processing system 229 may be an estimate of the actual position of receiver 206 relative to platform 226.

Additionally, when interference 214 is present, global positioning system signals 208 received at receiver 206 may be degraded and/or have more noise than desired. Receiver 206 may use navigation information 220 in number of first radio frequency signals 205 to process global positioning system signals 208.

For example, interference 214 may cause global positioning system signal 244 received from satellite 246 in plurality of satellites 210 to have more noise than desired. Global positioning system signal 244 includes data message 248 and pseudorandom code 253 superimposed on carrier signal 251. Carrier signal 251 may be a sinusoidal waveform having a selected carrier frequency. Data message 248 is a 50 bits per second (bps) binary data stream. Data message 248 may also be referred to as a navigation message.

Pseudorandom code 253 comprises a pseudorandom binary sequence that repeats in global positioning system signal 244. For example, pseudorandom code 253 may be a coarse acquisition (C/A) code for global positioning system signal 244 that comprises about 1,023 bits that have a frequency of about 1.023 megabits per second (Mbit/s).

When receiver 206 encounters interference 214, interference 214 may make it more difficult than desired for receiver 206 to acquire and/or track global positioning system signal 244. Acquiring global positioning system signal 244 includes aligning or synchronizing pseudorandom code 253 with pseudorandom code 250 generated by receiver 206. Pseudorandom code 250 generated by receiver 206 may be substantially identical to pseudorandom code 253. Further, when global positioning system signal 244 is acquired by receiver 206, receiver 206 can process data message 248 and/or other suitable information in global positioning system signal 244. Tracking global positioning system signal 244 includes locking onto global positioning system signal 244.

Receiver 206 may use navigation information 220 in radio frequency signal 224 to acquire and/or track global positioning system signal 244. In one illustrative example, navigation information 220 in radio frequency signal 224 sent by platform 226 includes data message 252. In this illustrative example, data message 252 is substantially identical to data message 248. In other words, data message 252 may be substantially the same data message received in global positioning system signal 244 from satellite 246.

In this illustrative example, platform 226 may receive global positioning system signal 244 sent by satellite 246 and identify data message 252 as data message 248 in global positioning system signal 244. In other illustrative examples, data message 252 may be sent to platform 226 from a different source, other than satellite 246. The source may be, for example, a different satellite in plurality of satellites 210, a ground station, a cellular tower, a control station, an aircraft, an unmanned aerial vehicle, a ship, a ground vehicle, or some other suitable platform. As one illustrative example, platform 226 may receive a global positioning system signal from another satellite in plurality of satellites 210 that includes data message 252.

When interference 214 is present, signal processing system 229 may use data message 252 to process global positioning system signal 244 received from satellite 246. In particular, data message 252 may be used to compensate for data message 248 when aligning pseudorandom code 253 in global positioning system signal 244 with pseudorandom code 250 generated by receiver 206 to acquire global positioning system signal 244. This type of compensation may be referred to as data wipe-off.

In these illustrative examples, position 216 is identified using radio frequency signal 224 and position 241 of platform 226. Receiver 206 uses position 216 and inertial data 255 to update information about position 216 and movement 257 of receiver 206. Inertial navigation system 254 associated with receiving platform 202 generates inertial data 255. Inertial navigation system 254 may include inertial measurement unit 256. Inertial measurement unit 256 generates data about the velocity, acceleration, and/or angular rotation of, as well as data about the gravitational forces acting on, receiver 206 and receiving platform 202.

Inertial measurement unit 256 may generate inertial data 255 at a high rate but may tend to drift. In other words, inertial measurement unit 256 may generate and update data at a high rate, but the accuracy of the data may decrease over time. Position 216 identified by signal processing system 229 may be used in combination with inertial data 255 from inertial measurement unit 256 to provide a more accurate estimation of the actual position and movement 257 of receiver 206 and receiving platform 202.

In this manner, the different advantageous embodiments provide an ad-hoc system for aiding a global positioning system receiver, such as receiver 206, anywhere in the world. Number of platforms 204 may send number of first radio frequency signals 205 to any receiver encountering interference, such as interference 214. In some cases, number of platforms 204 may travel to a location near the receiver requesting assistance to send number of first radio frequency signals 205 to the receiver.

Figure 3:
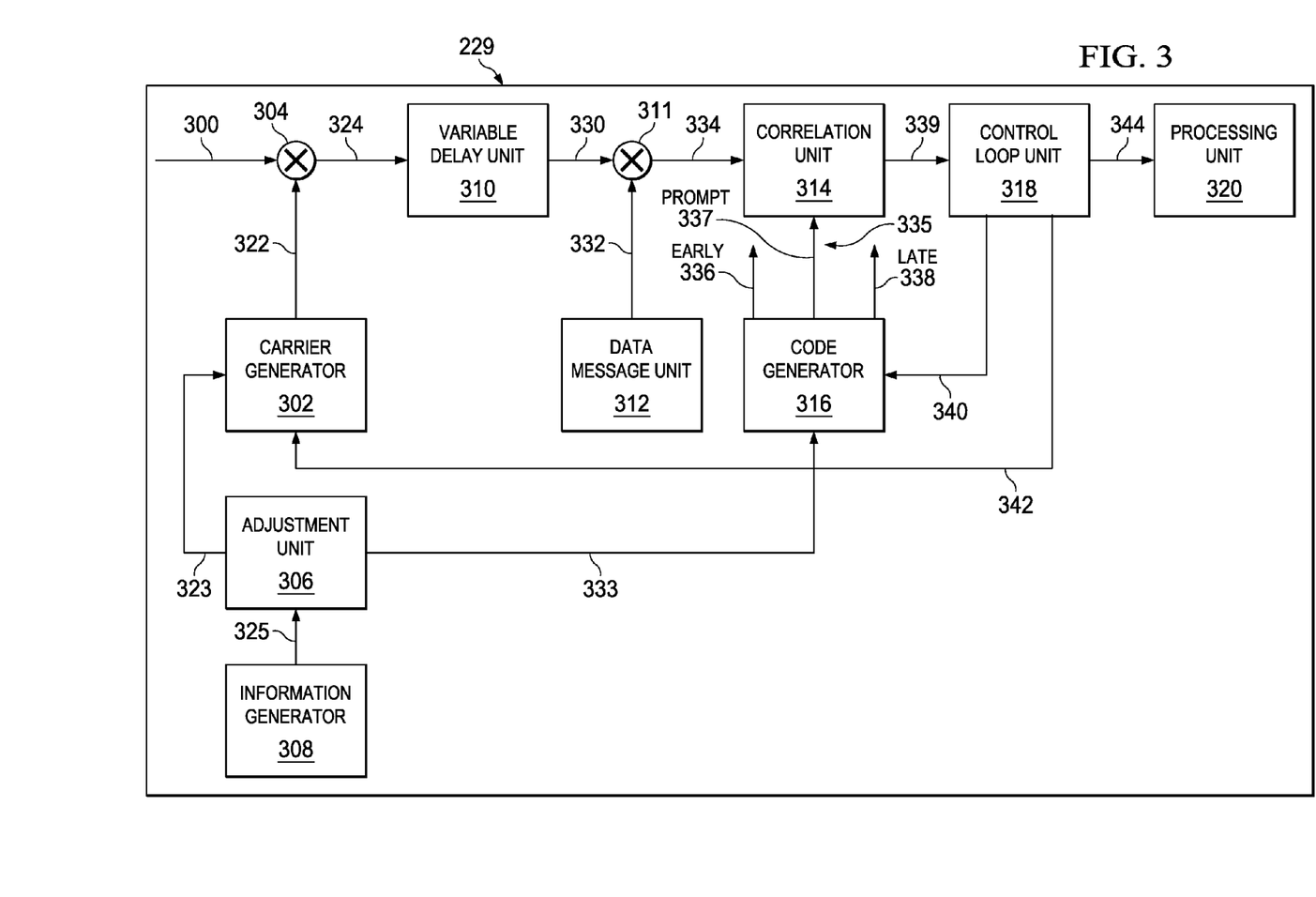
FIG. 3 is an illustration of a signal processing system processing a signal in accordance with an advantageous embodiment.

With reference now to FIG. 3, an illustration of a signal processing system processing a signal is depicted in accordance with an advantageous embodiment. In FIG. 3, signal processing system 229 is depicted in one manner in which signal processing system 229 from FIG. 2 may be implemented.

Signal processing system 229 is configured to receive and process signal 300. Signal 300 is received in a channel in signal processing system 229 of receiver 206 in FIG. 2. Signal 300 may be a global positioning system signal in digital form.

In this illustrative example, signal 300 is global positioning system signal 244 in FIG. 2. In particular, signal 300 is global positioning system signal 244 that has been down-converted to an Intermediate Frequency (I/F) and converted from an analog signal to a digital signal. Further, in this example, signal 300 comprises carrier signal 251 on which pseudorandom code 253 and data message 248 in FIG. 2 are superimposed in digital form.

As illustrated, signal processing system 229 includes carrier generator 302, multiplier 304, adjustment unit 306, information generator 308, variable delay unit 310, data message unit 312, multiplier 311, correlation unit 314, code generator 316, control loop unit 318, and processing unit 320.

In this illustrative example, carrier generator 302 generates carrier signal 322. Carrier signal 322 has a carrier frequency and/or phase that is selected based on the expected frequency and/or phase for carrier signal 251. In this manner, carrier signal 322 may be an estimate of carrier signal 251 in signal 300. In some cases, carrier signal 322 may be referred to as a replica of carrier signal 251.

The phase and/or frequency of carrier signal 322 are adjusted based on adjustment 323 generated by adjustment unit 306. Adjustment 323 is generated based on dynamics information 325, and dynamics information 325 is generated by information generator 308. Dynamics information 325 includes information about position 216 and movement 257 of receiver 206 identified using radio frequency signal 224 sent by platform 226 in FIG. 2 and/or inertial data 255 generated by inertial measurement unit 256 in FIG. 2.

In some cases, information generator 308 may use position 216 identified using radio frequency signal 224 to identify dynamics information 325 when inertial measurement unit 256 is unable to provide inertial information of a desired quality. For example, one or more platforms in number of platforms 204 may send one or more radio frequency signals in number of first radio frequency signals 205 to receiver 206 in FIG. 2. These multiple radio frequency signals may be used to obtain the information about the movement of receiver 206 and/or the dynamics receiver 206 is experiencing.

Further, in generating dynamics information 325, information generator 308 takes into account the coordinates along a line of sight between receiver 206 and satellite 246 that generated global positioning system signal 244 for signal 300. Additionally, information generator 308 takes into account the vector between inertial measurement unit 256 and a phase center of antenna system 228 for receiver 206. This vector may be referred to as a lever arm.

Information generator 308 uses this lever arm to identify the displacement of the phase center of antenna system 228 for angular rotations and linear accelerations detected by inertial measurement unit 256. This displacement in coordinates along the line of sight to satellite 246 is provided to adjustment unit 306. Adjustment unit 306 uses this information to adjust the frequency for carrier signal 322 generated by carrier generator 302.

Carrier signal 322 is multiplied with signal 300 at multiplier 304 to generate modified signal 324. Multiplying carrier signal 322 with signal 300 substantially removes carrier signal 251 in signal 300 from signal 300 to form modified signal 324. When carrier signal 251 is removed, pseudorandom code 253 and data message 248 remain in modified signal 324.

Modified signal 324 comprises in-phase (I) and quadraphase (Q) sampled data. In this illustrative example, only the in-phase processing of modified signal 324 is depicted. Similar processing of modified signal 324, as described below, may also be applied to the quadraphase sampled data.

As depicted, modified signal 324 may then be sent into variable delay unit 310. Variable delay unit 310 generates delayed signal 330, which is modified signal 324 that has been delayed in time.

Variable delay unit 310 delays the sending of modified signal 324 to multiplier 311 until data message 332 has been sent into multiplier 311 by data message unit 312. In this manner, data message 332 and delayed signal 330 reach multiplier 311 at substantially the same time.

In this illustrative example, data message 332 may be obtained from data message 252 in navigation information 220 in radio frequency signal 224 in FIG. 2. Data message 252, and thus data message 332, is substantially the same as data message 248 in global positioning system signal 244 in FIG. 2. In other illustrative examples, data message 332 may be a copy or replica of data message 248 obtained from some other suitable source.

Data message 332 and delayed signal 330 arrive at multiplier 311 at substantially the same time and are multiplied at multiplier 311. This multiplication generates final signal 334. In other words, data message 332 is used to remove data message 248 in delayed signal 330 with pseudorandom code 253 remaining in final signal 334. This removal of data message 248 may be referred to as a data wipe-off.

Final signal 334 is sent into correlation unit 314 along with pseudorandom code 335 generated by code generator 316. Code generator 316 generates pseudorandom code 335 as pseudorandom code 253 that is known for satellite 246 from which global positioning system signal 244 is received. Pseudorandom code 335 sent to correlation unit 314 may be considered a replica of pseudorandom code 253.

Pseudorandom code 335 is sent into correlation unit 314 along early path 336, prompt path 337, and late path 338 to generate early and late correlation values for final signal 334. In other words, code generator 316 sends pseudorandom code 335 into correlation unit 314 with a certain timing relative to final signal 334 to try to align pseudorandom code 335 with pseudorandom code 253 in final signal 334. This timing may be adjusted based on adjustment 333 sent to code generator 316 from adjustment unit 306.

Correlation unit 314 uses integration and correlation techniques to generate correlated signal 339. The period of time during which integration of final signal 334 occurs is extended when data message 248 is not present in final signal 334, as compared to when data message 248 is present. When data message 248 is present, the integration period of time may be limited to up to about 20 milliseconds, because data message 248 has a rate of about 50 bits per second. With data message 248 removed, the integration period of time may be extended beyond this 20 millisecond limit. Correlated signal 339 is sent into control loop unit 318, which sends the signal for further processing by signal processing system 229.

Control loop unit 318 determines whether a desired correlation is present between final signal 334 and pseudorandom code 335 based on correlated signal 339. A desired correlation is present when pseudorandom code 335 and pseudorandom code 253 in final signal 334 are substantially aligned or synchronized within a selected tolerance. Integration of correlated signal 339 with this type of alignment produces substantially equal and opposite values of the early and late correlation values for correlated signal 339 over the selected integration period of time.

When a desired correlation is not present between final signal 334 and pseudorandom code 335, control loop unit 318 sends adjustment 340 to code generator 316 and adjustment 342 to carrier generator 302. Adjustment 340 sent to code generator 316 may be for advancing or retarding pseudorandom code 335 with respect to the previous timing at which pseudorandom code 335 was sent into correlation unit 314. Adjustment 342 sent to carrier generator 302 may be for changing the frequency and/or phase of carrier signal 322.

When the desired correlation is present between final signal 334 and pseudorandom code 335, signal 344 is sent to processing unit 320 in signal processing system 229 for further processing. Processing unit 320 may use at least one of pseudorandom code 253 in signal 344 and data message 332 provided by data message unit 312 to identify when global positioning system signal 244 was sent by satellite 246 and when global positioning system signal 244 was received at receiver 206. Of course, this processing takes into account clock error for receiver 206 as well as the delay created by variable delay unit 310.

In this manner, global positioning system signal 244 sent by satellite 246 may be acquired and/or tracked using signal processing system 229.

The illustration of navigation environment 200 in FIG. 2 and signal processing system 229 in FIG. 3 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in another advantageous embodiment.

For example, in some illustrative examples, second radio frequency signals 207 may be received from sources other than plurality of satellites 210. For example, second radio frequency signals 207 may be sent from sources including, without limitation, an aircraft, an unmanned aerial vehicle, a ship, a ground station, a control station, and/or other suitable types of sources. A ground station may be a building or some other suitable type of stationary platform that transmits second radio frequency signals 207.

In other illustrative examples, additional types of information may be included in navigation information 220 in addition to the ones described above. For example, navigation information 220 may include an identification of the platform in number of platforms 204 from which a radio frequency signal is sent and/or other suitable information.

Additionally, in some cases, other processing units in addition to the ones described above may be present in signal processing system 229. For example, other components may be present for processing other global positioning system signals in parallel with the processing of signal 300.

In other illustrative examples, adjustment unit 306 may only use information obtained from number of first radio frequency signals 205 sent by number of platforms 204 to generate adjustment 323 and may not use inertial information provided by inertial measurement unit 256 in FIG. 2.

In the different advantageous embodiments, signal processing system 229 can be implemented in software, hardware, or a combination of the two. When software is used, the operations performed by the processes may be implemented in the program code configured to be run on a processor unit. When hardware is employed, the hardware may include circuits that operate to perform the operations in the processes illustrated.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

Figure 4:
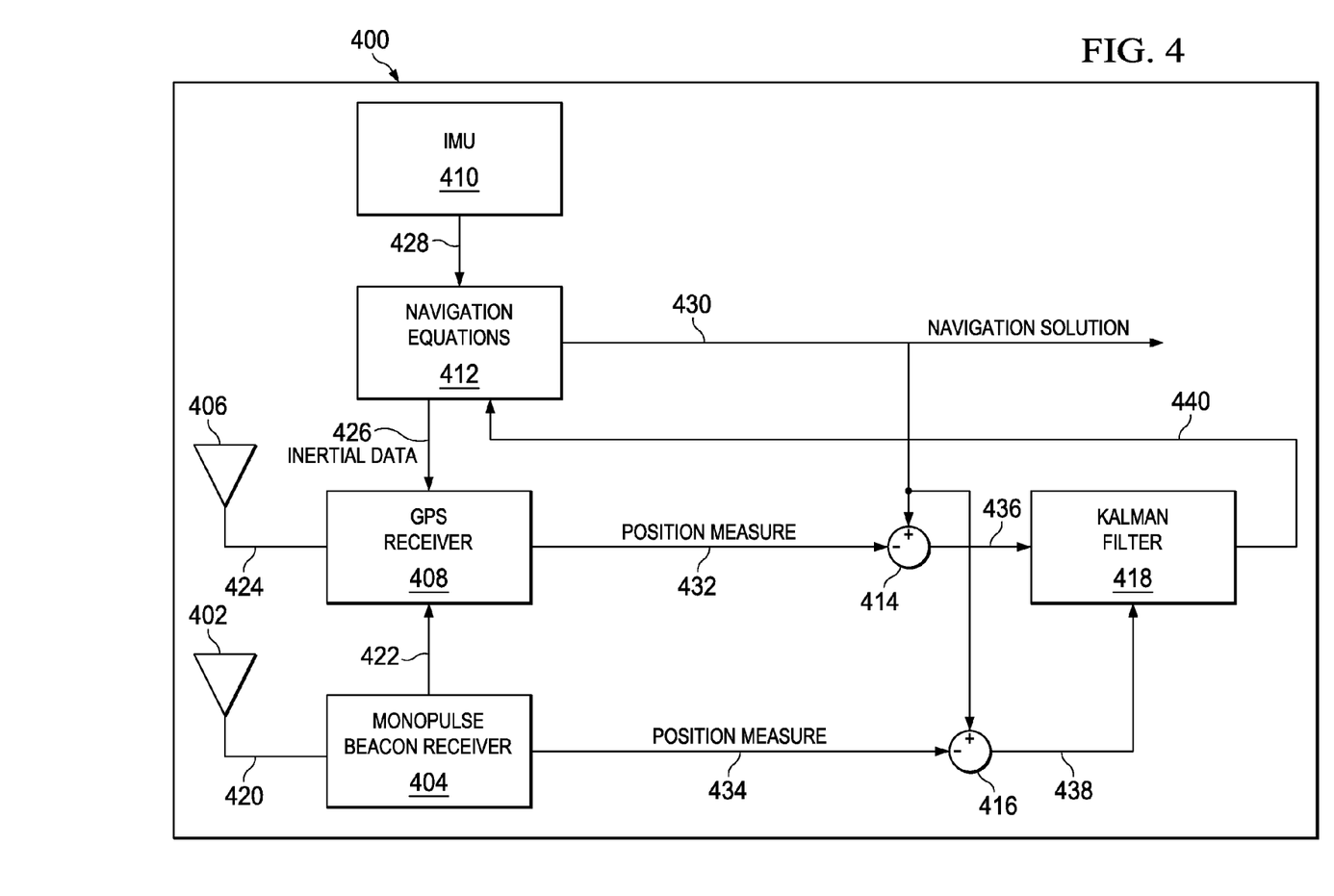
FIG. 4 is an illustration of a process flow of information generated by systems onboard a receiving platform in accordance with an advantageous embodiment.

With reference now to FIG. 4, an illustration of a process flow of information generated by systems onboard a receiving platform is depicted in accordance with an advantageous embodiment. In this illustrative example, receiving platform 400 is an example of one implementation for receiving platform 202 in FIG. 2.

As depicted, receiving platform 400 includes phased array antenna 402, monopulse beacon receiver 404, global positioning system antenna 406, global positioning system receiver 408, inertial measurement unit 410, navigation equation unit 412, subtractor 414, subtractor 416, and Kalman filter 418.

Phased array antenna 402 may be one of number of antennas 230 in antenna system 228 in FIG. 2. Phased array antenna 402 sends radio frequency signal 420 to monopulse beacon receiver 404. Monopulse beacon receiver 404 is configured to use radio frequency signal 420 and information in radio frequency signal 420 to identify a position of receiving platform 400. Monopulse beacon receiver 404 generates position data 422 and sends position data 422 to global positioning system receiver 408. In this illustrative example, global positioning system receiver 408 is an example of one implementation for signal processing system 229 in FIGS. 2 and 3.

Global positioning system receiver 408 also receives global positioning system signal 424 from global positioning system antenna 406. Global positioning system antenna 406 may be one of number of antennas 230 in antenna system 228 in FIG. 2.

Further, global positioning system receiver 408 also receives inertial data 426 from navigation equation unit 412. Navigation equation unit 412 generates inertial data 426 based on data 428 received from inertial measurement unit 410. Further, navigation equation unit 412 also generates navigation solution 430. Navigation solution 430 may include, for example, information about the position and movement of receiving platform 400 that may be displayed to an operator of receiving platform 400 and/or used in some other suitable manner.

Global positioning system receiver 408 uses inertial data 426, position data 422, and global positioning system signal 424 to generate position measurements 432. Monopulse beacon receiver 404 generates position measurements 434 using radio frequency signal 420.

In this illustrative example, position measurements 432 are subtracted from navigation solution 430 at subtractor 414 to generate output 436. Position measurements 434 are subtracted from navigation solution 430 at subtractor 416 to generate output 438.

As illustrated, output 436 and output 438 are sent into Kalman filter 418 as inputs. Kalman filter 418 uses these inputs to generate adjustments 440. Adjustments 440 are sent to navigation equation unit 412 for use in adjusting navigation solution 430.

Figure 5:
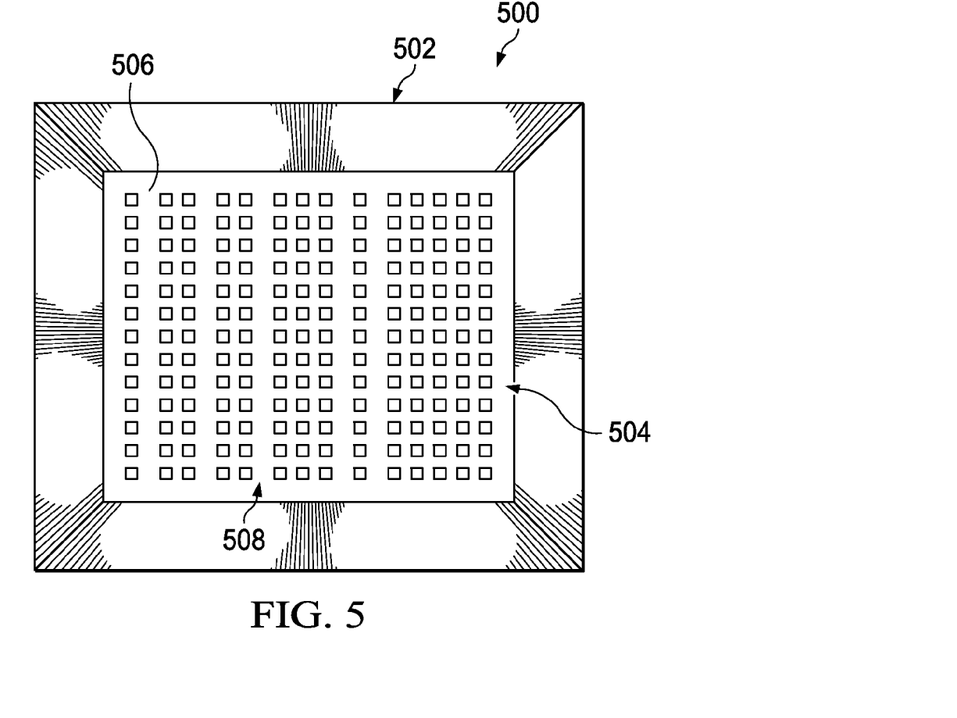
FIG. 5 is an illustration of a receiver in accordance with an advantageous embodiment.

With reference now to FIG. 5, an illustration of a receiver is depicted in accordance with an advantageous embodiment. In this illustrative example, receiver 500 is an example of one implementation for receiver 206 in FIG. 2. As depicted, receiver 500 includes housing 502 and antenna system 504 associated with housing 502. In this depicted example, antenna system 504 comprises phased array antenna 508. Phased array antenna 508 is located on side 506 of housing 502. Phased array antenna 508 is configured to receive radio frequency signals, such as number of first radio frequency signals 205 and/or second radio frequency signals 207 in FIG. 2.

Figure 6:
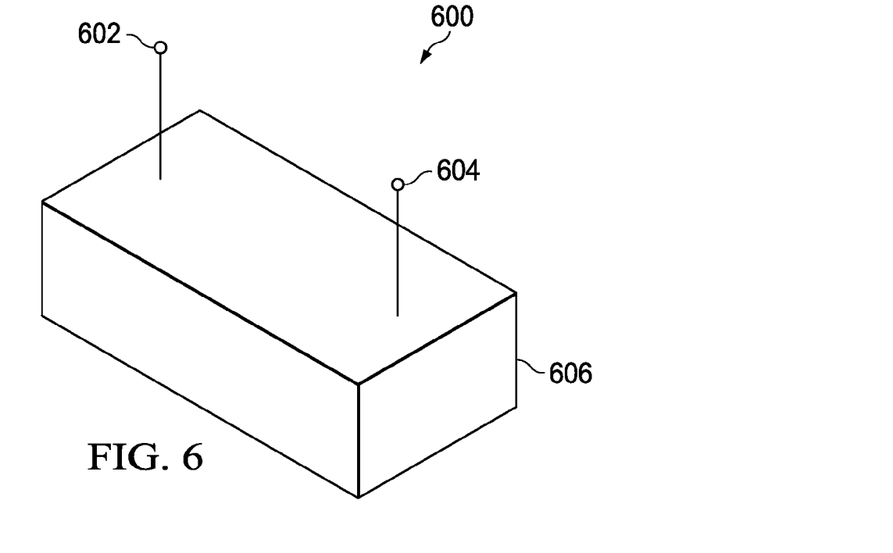
FIG. 6 is an illustration of a transmitter in accordance with an advantageous embodiment.

Turning now to FIG. 6, an illustration of a transmitter is depicted in accordance with an advantageous embodiment. In this illustrative example, transmitter 600 is an example of one manner in which transmitter 225 for platform 226 in FIG. 2 may be implemented. As depicted, transmitter 600 comprises monopole antenna 602 and monopole antenna 604.

Further, transmitter 600 includes electronic system 606. Electronic system 606 is configured to generate the radio frequency signals that are transmitted by monopole antenna 602 and monopole antenna 604. For example, electronic system 606 may comprise a number of printed circuit boards (PCBs) configured to digitally control and modulate the radio frequency signals, as well as control voltages.

Figure 7:
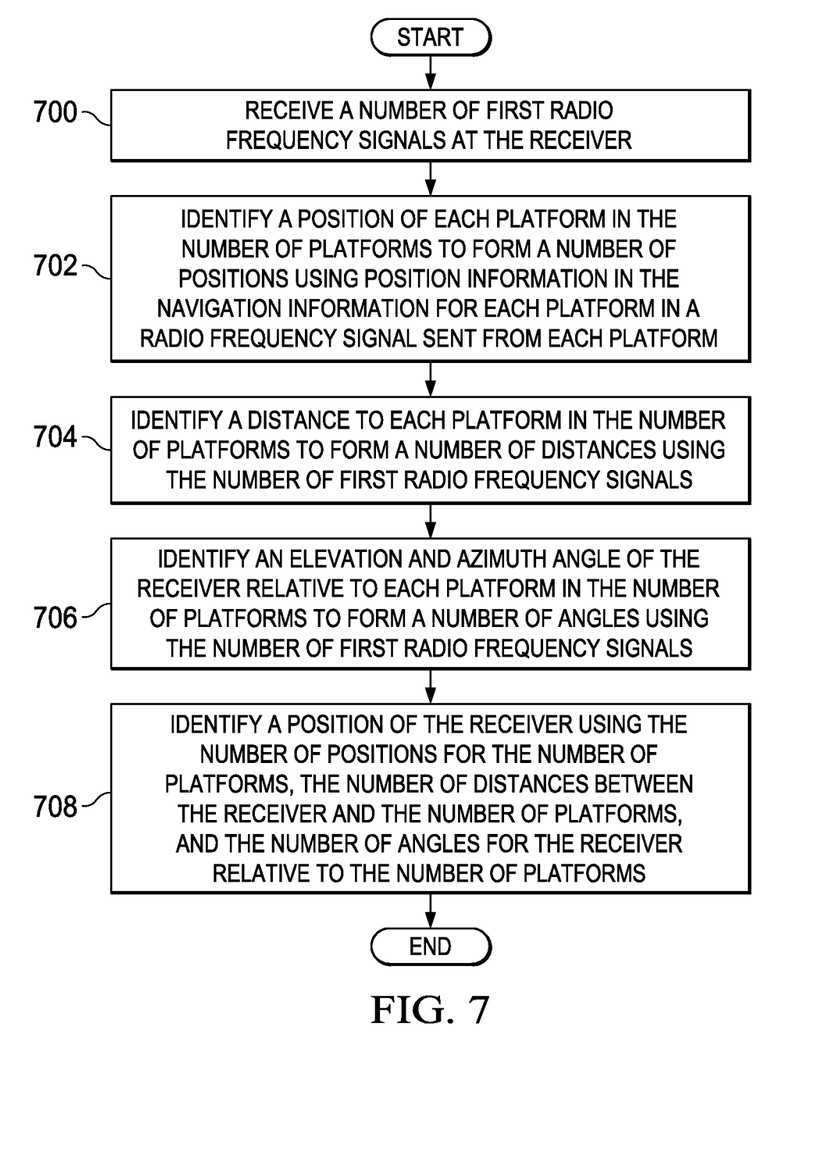
FIG. 7 is an illustration of a flowchart of a process for identifying a location of a receiver in accordance with an advantageous embodiment.

With reference now to FIG. 7, an illustration of a flowchart of a process for identifying a location of a receiver is depicted in accordance with an advantageous embodiment. The process illustrated in FIG. 7 may be implemented in navigation environment 200 in FIG. 2. In particular, the process may be implemented using receiver 206 in FIG. 2.

The process begins by receiving a number of first radio frequency signals at the receiver (operation 700). In operation 700, the number of first radio frequency signals may include navigation information. The number of first radio frequency signals may be sent to the receiver from a number of platforms. The number of platforms is configured to receive second radio frequency signals with the navigation information from a plurality of satellites in a global positioning system.

Thereafter, the process identifies a position of each platform in the number of platforms to form a number of positions using position information in the navigation information for each platform in a radio frequency signal sent from each platform (operation 702). The process then identifies a distance to each platform in the number of platforms to form a number of distances using the number of first radio frequency signals (operation 704).

Next, the process identifies an elevation angle and azimuth angle of the receiver relative to each platform in the number of platforms to form a number of angles using the number of first radio frequency signals (operation 706).

The process then identifies a position of the receiver using the number of positions for the number of platforms, the number of distances between the receiver and the number of platforms, and the number of angles for the receiver relative to the number of platforms (operation 708), with the process terminating thereafter. In this manner, the receiver identifies the position of the receiver using the number of radio frequency signals.

Figure 8:
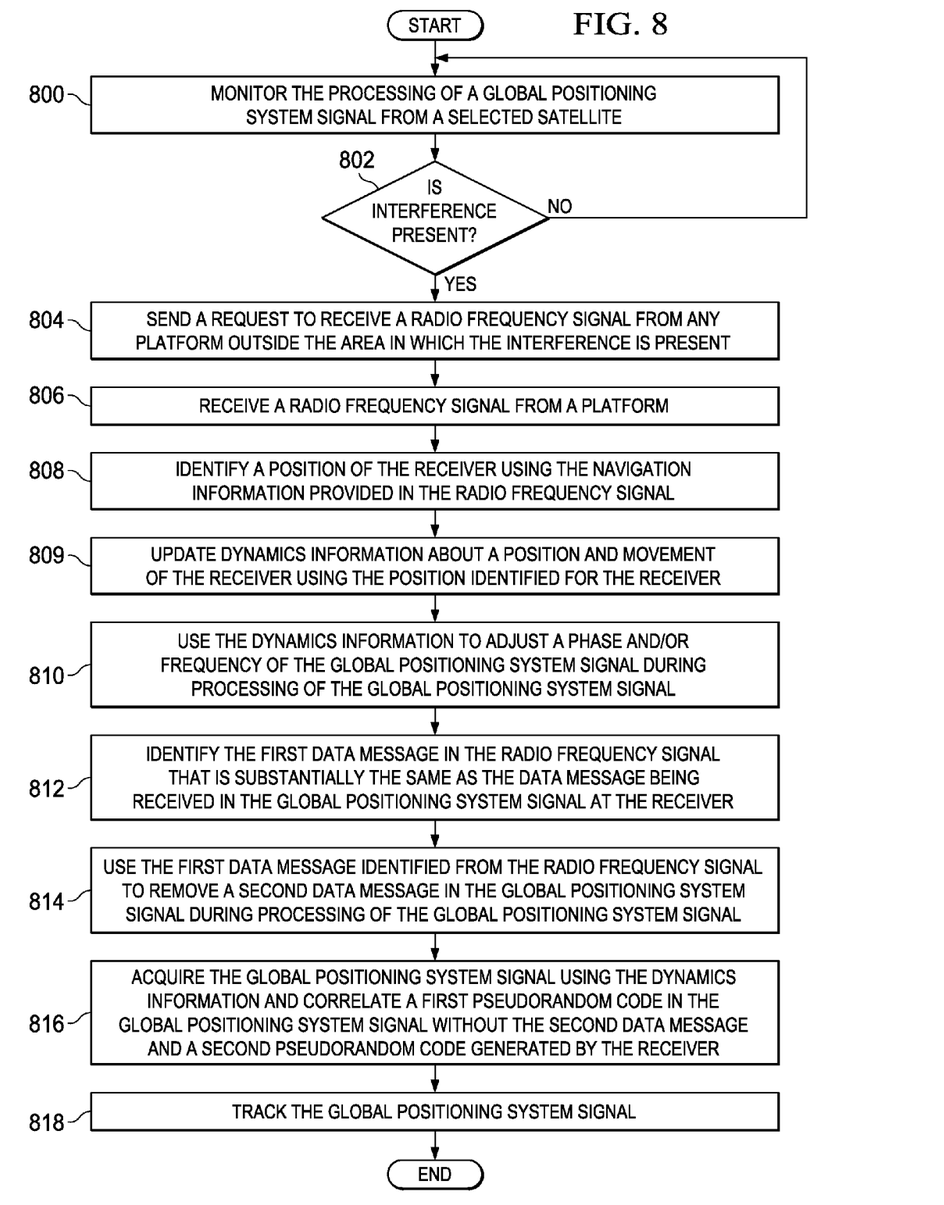
FIG. 8 is an illustration of a flowchart of a process for processing a global positioning system signal in the presence of interference in accordance with an advantageous embodiment.

With reference now to FIG. 8, an illustration of a flowchart of a process for processing a global positioning system signal in the presence of interference is depicted in accordance with an advantageous embodiment. The process illustrated in FIG. 8 may be implemented in navigation environment 200 in FIG. 2. In particular, this process may be implemented using receiver 206 associated with receiving platform 202 in FIG. 2.

The process begins by monitoring the processing of a global positioning system signal from a selected satellite (operation 800). The process then determines whether interference is present (operation 802). Interference may be present when the receiving platform is an area in which interference is present. If interference is not present, the process returns to operation 800.

Otherwise, if interference is present, the process sends a request to receive a radio frequency signal from any platform outside the area in which the interference is present (operation 804). The radio frequency signal is for assistance in the processing of the global positioning system signal from the selected satellite.

In operation 804, the request may be sent in the form of one or more radio frequency signals. In other illustrative examples, in operation 804, the request may be to receive more than one radio frequency signal from platforms outside the area of interference.

The process then receives a radio frequency signal from a platform (operation 806). The radio frequency signal includes navigation information, such as, for example, position information for the platform, timing information, and a first data message. The first data message is obtained from the global positioning system signal sent to the platform from the selected satellite. In this illustrative example, the platform may be located outside the area in which the interference is present.

Thereafter, the process identifies a position of the receiver using the navigation information provided in the radio frequency signal (operation 808). In this illustrative example, identifying the position of the receiver in operation 808 may be performed using, for example, operations 702-708 in FIG. 7.

The process then updates dynamics information about a position and movement of the receiver using the position identified for the receiver (operation 809). In some illustrative examples, the dynamics information may also be updated using inertial data generated by, for example, inertial measurement unit 256 in FIG. 2. The inertial data may include, for example, information about the velocity of the receiver, acceleration of the receiver, gravitational forces acting on the receiver, angular rotation of the receiver, and/or other suitable data.

Next, the process uses the dynamics information to adjust a phase and/or frequency of the global positioning system signal during processing of the global positioning system signal (operation 810).

The process then identifies the first data message in the radio frequency signal that is substantially the same as the data message being received in the global positioning system signal at the receiver (operation 812). The process uses the first data message identified from the radio frequency signal to remove a second data message in the global positioning system signal during processing of the global positioning system signal (operation 814).

Thereafter, the process acquires the global positioning system signal using the dynamics information and correlating a first pseudorandom code in the global positioning system signal without the second data message and a second pseudorandom code generated by the receiver (operation 816). The process then tracks the global positioning system signal (operation 818), with the process terminating thereafter.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for identifying a position of a receiver. A number of first radio frequency signals including navigation information at the receiver is received. The first number of radio frequency signals is sent from a number of platforms configured to receive second radio frequency signals from a plurality of satellites in a global positioning system. A position of the receiver is identified using a number of distances and a number of angles identified from the number of first radio frequency signals and a number of positions for the number of platforms.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a position of a receiver comprising an antenna and a signal processing system, in an area of interference, the method comprising:
   receiving, at an antenna system on the receiver, a first radio frequency signal from a platform, the first radio frequency signal comprising navigation information, the platform being distinct from the receiver;
   receiving at the receiver and the platform, a second radio frequency signal from a satellite in a global positioning system;
   measuring, using a time of transmission of the first radio frequency signal, the antenna system, and the signal processing system, such that the signal processing system comprises at least one of:
   a processor unit;
   a digital signal processor; and
   a number of integrated circuits,
   a distance from the receiver to the platform using the first radio frequency signal;
   measuring, using the antenna system, the first radio frequency signal, and the signal processing system, an elevation angle and an azimuth angle of the receiver relative to the platform to form a number of angles; and
   identifying, using the signal processing system and the number of angles and a position for the platform, a movement and the position of the receiver via:
      receiving inertial data from a navigation equation unit using outputs from an inertial measurement unit
         generating first position measurements using the second radio frequency signal and the inertial data
         sending the first position measurements to a first subtractor;
      the navigation equation unit:
         receiving data generated by the inertial measurement unit
         receiving adjustments generated by the receiver; and
         generating a navigation solution using the data generated by the inertial measurement unit and the adjustments;
         sending the navigation solution to the first subtractor;
         sending the navigation solution to a second subtractor;
      the inertial measurement unit:
         generating data and sending the data to the navigation equation unit
      the first subtractor:
         receiving the first position measurements generated by a global positioning system receiver;

receiving a navigation solution generated by the navigation equation unit;
generating a first output;
the second subtractor:
receiving second position measurements from a beacon receiver;
receiving the navigation solution, and
generating a second output comprising the second position measurements subtracted from the navigation solution; and
sending the second output to a filter:
the filter:
receiving the first output generated by the first subtractor,
receiving the second output generated by the second subtractor, and
generating the adjustments;
sending the adjustments to the navigation equation unit, such that the receiver uses the first radio frequency signal for navigating.

2. The method of claim 1, further comprising:
identifying the position of the platform using the navigation information in the first radio frequency signal received from the platform; and
identifying the position of the receiver relative to the platform using the position of the platform, the distance to the platform, and the elevation angle and the azimuth angle of the receiver relative to the platform.

3. The method of claim 1 further comprising:
receiving the second radio frequency signal at the receiver in an area comprising interference such that the receiver cannot identify its location through the global positioning system.

4. The method of claim 3 further comprising:
identifying a first data message in the navigation information in the first radio frequency signal sent from the platform and received by the receiver; and
removing using the first data message, a second data message in the second radio frequency signal received by the receiver from the satellite, wherein the first data message and the second data message are substantially identical.

5. The method of claim 4, the satellite being a first satellite and receiver receiving the first data message from the platform in a third radio frequency signal from a second satellite.

6. The method of claim 4, wherein the step of removing, using the first data message, the second data message in the second radio frequency signal received from the satellite extends a period of time for performing integration of the second radio frequency signal.

7. The method of claim 1, wherein the receiver is associated with a mobile platform and further comprising:
updating information about the position and movement of the receiver using at least one of: the position of the receiver, and inertial data generated by an inertial measurement unit associated with the mobile platform.

8. The method of claim 7, further comprising:
the information about the position and the movement of the receiver comprising at least one of: the position of the receiver, a velocity of the receiver, an acceleration of the receiver, an angular rotation of the receiver, and gravitational forces acting on the receiver; and
processing of the second radio frequency signal via adjusting, a phase of the second radio frequency signal.

9. The method of claim 7, further comprising determining the information about the position and movement of the receiver via the inertial measurement unit, a global positioning receiver, a monopulse beacon receiver, and a Kalman filter.

10. The method of claim 1, further comprising:
receiving the first radio frequency signal at the antenna system associated with the receiver, and receiving the first radio frequency signal from the platform receiving the second radio frequency signal from the satellite in the global positioning system, the second radio frequency signal comprising a location of the satellite and a send time for the second radio frequency signal.

11. The method of claim 1, wherein the navigation information comprises at least one of timing information, position information, and a data message.

12. The method of claim 1, further comprising an area comprising the position of the receiver also comprising interference and the position of the platform being outside the interference.

13. The method of claim 1, further comprising the first radio frequency signal comprising a monopulse radar beacon signal.

14. The method of claim 1, further comprising the platform comprising at least one of: an aircraft, a jet airplane, a helicopter, an unmanned aerial vehicle, a passenger aircraft, a cargo aircraft, a second satellite, a space vehicle, a submarine, a personnel carrier, a ground vehicle, a tank, a truck, an unmanned ground vehicle, a train, an automobile, a bus, and a surface ship.

15. The method of claim 1 further comprising:
prior to receiving the first radio frequency signal, sending a request to receive the first radio frequency signal from a platform located outside an area of the receiver in which interference is present.

16. The method of claim 1 further comprising:
aligning pseudorandom code in a signal of the global positioning system with pseudorandom code generated by the receiver and acquiring a global positioning system signal using a data message from the platform.

17. The method of claim 1, further comprising:
the navigation information comprising:
position information, as identified by the platform, of the platform;
information used for identifying the position of the receiver relative to the platform; and
the first radio frequency signal comprising an identification of the platform; and
the first radio frequency signal comprising a monopulse radar beacon signal formed as a radio frequency beam.

18. The method of claim 1, further comprising:
associating the receiver with a receiver platform comprising a phased array antenna, a monopulse beacon receiver, a global positioning system antenna, a global positioning system receiver, an inertial measurement unit, a navigation equation unit, a first subtractor, a second subtractor, and a Kalman filter;
the monopulse beacon receiver:
receiving first radio frequency signals as an input via the phased array antenna;
generating position data based on the first radio frequency signals and sending the position data to the global positioning system receiver; and
generating second position measurements using the first radio frequency signals and receiving the second position measurements at the second subtractor;
the global positioning system receiver:
receiving second radio frequency signals via the global positioning system antenna;

receiving inertial data from the navigation equation unit using outputs from the inertial measurement unit;

generating first position measurements using the second radio frequency signals and the inertial data; and sending the first position measurements to the first subtractor;

the navigation equation unit:
receiving the data generated by the inertial measurement unit;
receiving adjustments generated by the Kalman filter; and
generating a navigation solution using the data generated by the inertial measurement unit and the adjustments;
sending the navigation solution to the first subtractor;
sending the navigation solution to the second subtractor; and
displaying the navigation solution to an operator of the receiver platform;

the inertial measurement unit:
generating the data comprising measurements of: a velocity of the receiver platform, an acceleration of the receiver platform, an angular rotation of the receiver platform, and a gravitational force acting on the receiver platform; and
sending the data generated by the inertial measurement unit to the navigation equation unit;

the first subtractor:
receiving the first position measurements generated by the global positioning system receiver;
receiving the navigation solution generated by the navigation equation unit;
generating a first output comprising the first position measurements subtracted from the navigation solution; and
sending the first output to the Kalman filter;

the second subtractor:
receiving the second position measurements generated by the monopulse beacon receiver,
receiving the navigation solution generated by the navigation equation unit, and
generating a second output comprising the second position measurements subtracted from the navigation solution; and
sending the second output to the Kalman filter; and the Kalman filter:
receiving the first output generated by the first subtractor,
receiving the second output generated by the second subtractor, and
generating the adjustments;
sending the adjustments to the navigation equation unit, such that the receiver platform uses the first radio frequency signals for navigating; and
using the navigation solution for displaying a position and movement of the receiver.

19. An apparatus comprising:
an antenna; and
a receiver that comprises a signal processing system configured such that in operation the signal processing system:
receives a number of first radio frequency signals that comprise navigation information from a number of platforms, each of the number of platforms being distinct from the receiver;
receives a number of second radio frequency signals at the antenna, the antenna and the number of platforms configured to receive the number of second radio frequency signals from a plurality of sources;
measures, using the antenna and the number of first radio frequency signals, a number of distances from the receiver to the number of platforms;
measures, using the antenna and the number of first radio frequency signals, a number of elevation angles and azimuth angles, of the receiver relative to the number of platforms, to form a number of angles;
estimates a position of the signal processing system using the number of distances and the number of angles identified from the number of first radio frequency signals and adjusts an estimate for the position of the signal processing system based upon dynamics experienced by receiver determined via a number of positions for the number of platforms.

20. The apparatus of claim 19 further comprising:
an antenna system connected to the signal processing system, wherein the antenna system and the signal processing system form the receiver associated with a receiving platform and wherein the antenna system is configured such that in operation the antenna system receives the number of first radio frequency signals sent from the number of platforms.

21. The apparatus of claim 20, wherein the antenna system comprises at least one of a phased array antenna, a controlled radiation pattern antenna (CRPA), a micropatch antenna, a quadrifilar helix antenna, and an antenna with spiral slot arrays.

22. The apparatus of claim 20 further comprising:
the receiving platform being a mobile platform associated with an inertial measurement unit and wherein the mobile platform is selected from one of: an aircraft, a jet airplane, a helicopter, an unmanned aerial vehicle, a passenger aircraft, a cargo aircraft, a satellite, a space vehicle, a submarine, a personnel carrier, a ground vehicle, a tank, a truck, an unmanned ground vehicle, a train, an automobile, a bus, and a surface ship.

23. The apparatus of claim 19, wherein the signal processing system comprises at least one of: a processor unit, a digital signal processor, and a number of integrated circuits.

24. The apparatus of claim 19, wherein a source in the plurality of sources is selected from one of a satellite, a global positioning system satellite, an aircraft, an unmanned aerial vehicle, a ship, a ground vehicle, a control station, a cellular tower, and a ground station.

25. A method for acquiring, in an area comprising interference, a global positioning system signal, the method comprising:
receiving, at a receiver associated with a mobile platform, the global positioning system signal from a satellite, the receiver comprising an antenna and a signal processing system;
receiving, at the antenna, a radio frequency signal comprising navigation information, from a platform, the navigation information comprising a first data message and the-platform receiving the global positioning system signal from the satellite;
measuring, using a time of transmission of the radio frequency signal, a distance from the receiver to the platform;
measuring, using the radio frequency signal, an elevation angle and an azimuth angle of the receiver relative to the platform to form a number of angles;
updating, using a program of the signal processing system, information about a position of the receiver and a movement of the receiver using a position of the platform and the position of the receiver identified using the distance and the number of angles;

removing a second data message in the global positioning system signal using the first data message, wherein the first data message and the second data message are substantially identical; and modifying the global positioning system signal using the information about the position and the movement of the receiver and correlating a first pseudorandom code in the global positioning system signal without the second data message and a second pseudorandom code generated by the receiver, such that the signal processing system provides assistance for navigating the mobile platform.

* * * * *

UNITED STATES PATENT AND TRADEMARK OFFICE
CERTIFICATE OF CORRECTION

PATENT NO. : 9,651,666 B2
APPLICATION NO. : 13/089559
DATED : April 19, 2011
INVENTOR(S) : Brekke It is certified that error appears in the above-identified patent and that said Letters Patent is hereby corrected as shown below:

In the Claims

Column 16, Line 35, Claim 1 change "circuits," to -- circuits; and --
    Line 45, Claim 1 change "unit" to -- unit; --
    Line 48, Claim 1 change "data" to -- data; --
    Line 53, Claim 1 change "unit" to -- unit; --
    Line 54, Claim 1 change "receiver; and" to -- receiver; --
    Line 58-59, Claim 1 change "subtractor;" to -- subtractor; and --

Column 17, Line 2, Claim 1 change "unit;" to -- unit; and --
    Line 7, Claim 1 change "solution, and" to -- solution; --
    Line 10, Claim 1 change "solution; and" to -- solution; --
    Line 11, Claim 1 change "filter:" to -- filter; and --
    Line 13-14, Claim 1 change "subtractor," to -- subtractor; --
    Line 16, Claim 1 change "subtractor, and" to -- subtractor; --
    Line 17, Claim 1 change "adjustments;" to -- adjustments; and --
    Line 29, Claim 3 change "claim 1" to -- claim 1, --
    Line 34, Claim 4 change "claim 3" to -- claim 3, --
    Line 44, Claim 4 change "and receiver" to -- and the receiver --
    Line 65, Claim 8 change "adjusting, a" to -- adjusting a --
    Line 66, Claim 9 change "comprising" to -- comprising: --

Column 18, Line 29, Claim 15 change "claim 1" to -- claim 1, --
    Line 34, Claim 16 change "claim 1" to -- claim 1, --

Column 19, Line 41, Claim 18 change "unit, and" to -- unit; --
    Line 47-48, Claim 18 change "subtractor," to -- subtractor; --
    Line 50, Claim 18 change "subtractor, and" to -- subtractor; --

Signed and Sealed this
Twenty-seventh Day of March, 2018

Andrei Iancu
*Director of the United States Patent and Trademark Office*

CERTIFICATE OF CORRECTION (continued)
U.S. Pat. No. 9,651,666 B2

Column 20, Line 15, Claim 19 change "by receiver" to -- by the receiver --
  Line 17, Claim 20 change "claim 19" to -- claim 19, --

Column 20, Line 30, Claim 22 change "claim 20" to -- claim 20, --
  Line 57, Claim 25 change "the-platform" to -- the platform --